US009697839B2

(12) United States Patent
McMillan et al.

(10) Patent No.: US 9,697,839 B2
(45) **Date of Patent: *Jul. 4, 2017**

(54) METHODS AND APPARATUS FOR AUDIO WATERMARKING

(71) Applicant: The Nielsen Company (US), LLC, New York, NY (US)

(72) Inventors: Francis Gavin McMillan, Tarpon Springs, FL (US); Istvan Stephen Joseph Kilian, Clearwater, FL (US)

(73) Assignee: The Nielsen Company (US), LLC, New York, NY (US)

( * ) Notice: Subject to any disclaimer, the term of this patent is extended or adjusted under 35 U.S.C. 154(b) by 28 days.

This patent is subject to a terminal disclaimer.

(21) Appl. No.: 14/800,383

(22) Filed: Jul. 15, 2015

(65) Prior Publication Data

US 2015/0317989 A1 Nov. 5, 2015

Related U.S. Application Data

(63) Continuation of application No. 13/708,266, filed on Dec. 7, 2012, now Pat. No. 9,117,442, which is a continuation of application No. 12/750,359, filed on Mar. 30, 2010, now Pat. No. 8,355,910.

(51) Int. Cl.

| | |
|---|---|
| ***G10L 21/02*** | (2013.01) |
| ***G10L 15/06*** | (2013.01) |
| ***G10L 19/018*** | (2013.01) |

(52) U.S. Cl.

CPC .................................. *G10L 19/018* (2013.01)

(58) Field of Classification Search

USPC .......................................... 704/226, 227, 243

See application file for complete search history.

(56) References Cited

U.S. PATENT DOCUMENTS

| | | | |
|---|---|---|---|
| 3,703,684 | A | 11/1972 | McVoy |
| 5,113,437 | A | 5/1992 | Best et al. |

(Continued)

FOREIGN PATENT DOCUMENTS

| | | |
|---|---|---|
| AU | 2011201212 | 10/2011 |
| CA | 2734666 | 9/2011 |

(Continued)

OTHER PUBLICATIONS

IP Australia, "Exam Report," issued in connection with Australian Patent Application No. 2011201212, on May 2, 2012, 2 pages.

(Continued)

*Primary Examiner* — Jesse Pullias

(74) *Attorney, Agent, or Firm* — Hanley, Flight & Zimmerman, LLC

(57) ABSTRACT

Methods and apparatus for audio watermarking are disclosed. Example methods disclosed herein include obtaining a watermarked noise signal having energy in a first frequency band, the watermarked noise signal being associated with a first operating state of a device. Disclosed example methods also include adjusting the watermarked noise signal based on an ambient audio level sensed by an audio sensor. Disclosed example methods further include emitting the adjusted watermarked noise signal via a speaker in response to determining that the device is in the first operating state.

20 Claims, 7 Drawing Sheets

(56) References Cited

U.S. PATENT DOCUMENTS

| | | | | |
|---|---|---|---|---|
| 5,161,210 | A * | 11/1992 | Druyvesteyn | G10L 19/018 704/200 |
| 5,162,905 | A | 11/1992 | Itoh et al. | |
| 5,787,334 | A | 7/1998 | Fardeau et al. | |
| 5,822,360 | A * | 10/1998 | Lee | G10L 19/018 370/493 |
| 5,872,588 | A | 2/1999 | Aras et al. | |
| 5,940,429 | A * | 8/1999 | Lam | G10L 19/018 370/527 |
| 6,272,176 | B1 | 8/2001 | Srinivasan | |
| 6,363,159 | B1 | 3/2002 | Rhoads | |
| 6,504,870 | B2 | 1/2003 | Srinivasan | |
| 6,512,796 | B1 * | 1/2003 | Sherwood | G10L 19/018 375/242 |
| 6,560,349 | B1 | 5/2003 | Rhoads | |
| 6,621,881 | B2 | 9/2003 | Srinivasan | |
| 6,674,861 | B1 * | 1/2004 | Xu | G10L 19/018 380/252 |
| 6,737,957 | B1 | 5/2004 | Petrovic et al. | |
| 6,845,360 | B2 * | 1/2005 | Jensen | H04H 20/31 341/52 |
| 6,968,564 | B1 | 11/2005 | Srinivasan | |
| 7,006,555 | B1 | 2/2006 | Srinivasan | |
| 7,184,570 | B2 | 2/2007 | Rhoads | |
| 8,355,910 | B2 * | 1/2013 | McMillan | G10L 19/018 704/226 |
| 9,117,442 | B2 * | 8/2015 | McMillan | G10L 19/018 |
| 2007/0130580 | A1 | 6/2007 | Covell et al. | |
| 2007/0294716 | A1 | 12/2007 | Jeong et al. | |
| 2008/0168493 | A1 * | 7/2008 | Allen | H04N 5/44504 725/37 |
| 2009/0077578 | A1 | 3/2009 | Steuer et al. | |
| 2009/0259325 | A1 | 10/2009 | Topchy et al. | |
| 2011/0246202 | A1 | 10/2011 | McMillan et al. | |
| 2013/0103172 | A1 | 4/2013 | McMillan | |

FOREIGN PATENT DOCUMENTS

| | | |
|---|---|---|
| CN | 102208187 | 10/2011 |
| EP | 2375411 | 10/2011 |
| JP | 2000068970 | 3/2000 |
| JP | 2001506098 | 5/2001 |
| JP | 2001188549 | 7/2001 |
| JP | 2001312299 | 11/2001 |
| JP | 2006504986 | 2/2006 |
| JP | 2011209723 | 10/2011 |
| WO | 9827504 | 6/1998 |
| WO | 2004036352 | 4/2004 |
| WO | 2007012987 | 2/2007 |

OTHER PUBLICATIONS

IP Australia, "Notice of Acceptance," issued in connection with Australian Patent Application No. 2011201212, on May 24, 2013, 3 pages.

Canadian Intellectual Property Office, "Office Action," issued in connection with Canadian Patent Application No. 2,734,666, on Jun. 21, 2013, 4 pages.

State Intellectual Property Office of China, "Notice of Decision of Grant," issued in connection with Chinese Patent Application No. 201110077492.0, on Nov. 27, 2013, 5 pages.

State Intellectual Property Office of China, "First Office Action," issued in connection with Chinese Patent Application No. 201110077492.0, on Apr. 6, 2012, 6 pages.

State Intellectual Property Office of China, "Second Office Action," issued in connection with Chinese Patent Application No. 201110077492.0, on Nov. 2, 2012, 13 pages.

European Patent Office, "Extended European Search Report," issued in connection with European Patent Application No. 11002591.3, on Jul. 12, 2011, 7 pages.

Japanese Patent Office, "Final Notice of Grounds for Rejection," issued in connection with Japanese Patent Application No. 2011-062768, on Mar. 12, 2013, 5 pages.

Japanese Patent Office, "Notice of Grounds for Rejection," issued in connection with Japanese Patent Application No. 2011-062768, on Sep. 18, 2012, 7 pages.

Tachibana, Ryuki, "Audio Watermarking for Live Performance," Proc. of Security and Watermarking of Multimedia Contents V, Santa Clara, USA, vol. 5020, Jan. 2003, pp. 32-43.

Tachibana et al., "An Audio Watermarking Method Using a Two-Dimensional Pseudo-Random Array," Elsevier Signal Processing, vol. 82, 2002, 15 pages.

United States Patent and Trademark Office, "Non-Final Office Action," issued in connection with U.S. Appl. No. 12/750,359, on Feb. 14, 2012, 22 pages.

United States Patent and Trademark Office, "Notice of Allowance," issued in connection with U.S. Appl. No. 12/750,359, on Sep. 24, 2012, 12 pages.

United States Patent and Trademark Office, "Notice of Allowability," issued in connection with U.S. Appl. No. 12/750,359, on Dec. 14, 2012, 2 pages.

IP Australia, "Patent Examination Report No. 1," issued in connection with Australian Patent Application No. 2013203336, dated Oct. 10, 2014 (2 pages).

United States Patent and Trademark Office, "Non-Final Office Action", issued in connection with U.S. Appl. No. 13/708,266, dated Sep. 11, 2014 (8 pages).

United States Patent and Trademark Office, "Ex-Parte Quayle Action", issued in connection with U.S. Appl. No. 13/708,266, dated Jan. 23, 2015 (2 pages).

United States Patent and Trademark Office, "Notice of Allowance", issued in connection with U.S. Appl. No. 13/708,266, dated Apr. 13, 2015 (9 pages).

IP Australia, "Notice of Acceptance", issued in connection with Australian Patent Application No. 2013203336, dated Oct. 26, 2015 (2 pages).

European Patent Office, "Examination Report", issued in connection with European Patent Application No. 11002591.3, dated Feb. 18, 2016 (5 pages).

European Patent Office, "Communication under Rule 71(3) EPC", issued in connection with European Patent Application No. 11002591.3, dated Dec. 12, 2016 (53 pages).

* cited by examiner

METHODS AND APPARATUS FOR AUDIO WATERMARKING

RELATED APPLICATION(S)

This patent arises from a continuation of U.S. application Ser. No. 13/708,266 (now U.S. Pat. No. 9,117,442), which is entitled "METHODS AND APPARATUS FOR AUDIO WATERMARKING" and which was filed on Dec. 7, 2012, which is a continuation of U.S. application Ser. No. 12/750,359 (now U.S. Pat. No. 8,355,910), which is entitled "METHODS AND APPARATUS FOR AUDIO WATERMARKING A SUBSTANTIALLY SILENT MEDIA CONTENT PRESENTATION" and which was filed on Mar. 30, 2010. U.S. patent application Ser. No. 12/750,359 and U.S. patent application Ser. No. 13/708,266 are hereby incorporated by reference in their respective entireties.

FIELD OF THE DISCLOSURE

This disclosure relates generally to audio watermarking and, more particularly, to methods and apparatus for audio watermarking a substantially silent media content presentation.

BACKGROUND

Audio watermarking is a common technique used to identify media content, such as television broadcasts, radio broadcasts, downloaded media content, streaming media content, prepackaged media content, etc., presented to a media consumer. Existing audio watermarking techniques identify media content by embedding an audio watermark, such as identifying information or a code signal, into an audible audio component having a signal level sufficient to hide the audio watermark. However, many media content presentations of interest do not include an audio component into which an audio watermark can be embedded, or may be presented with their audio muted or attenuated near or below a signal level perceivable by an average person and, thus, which is insufficient to hide an audio watermark.

DETAILED DESCRIPTION

Figure 1:
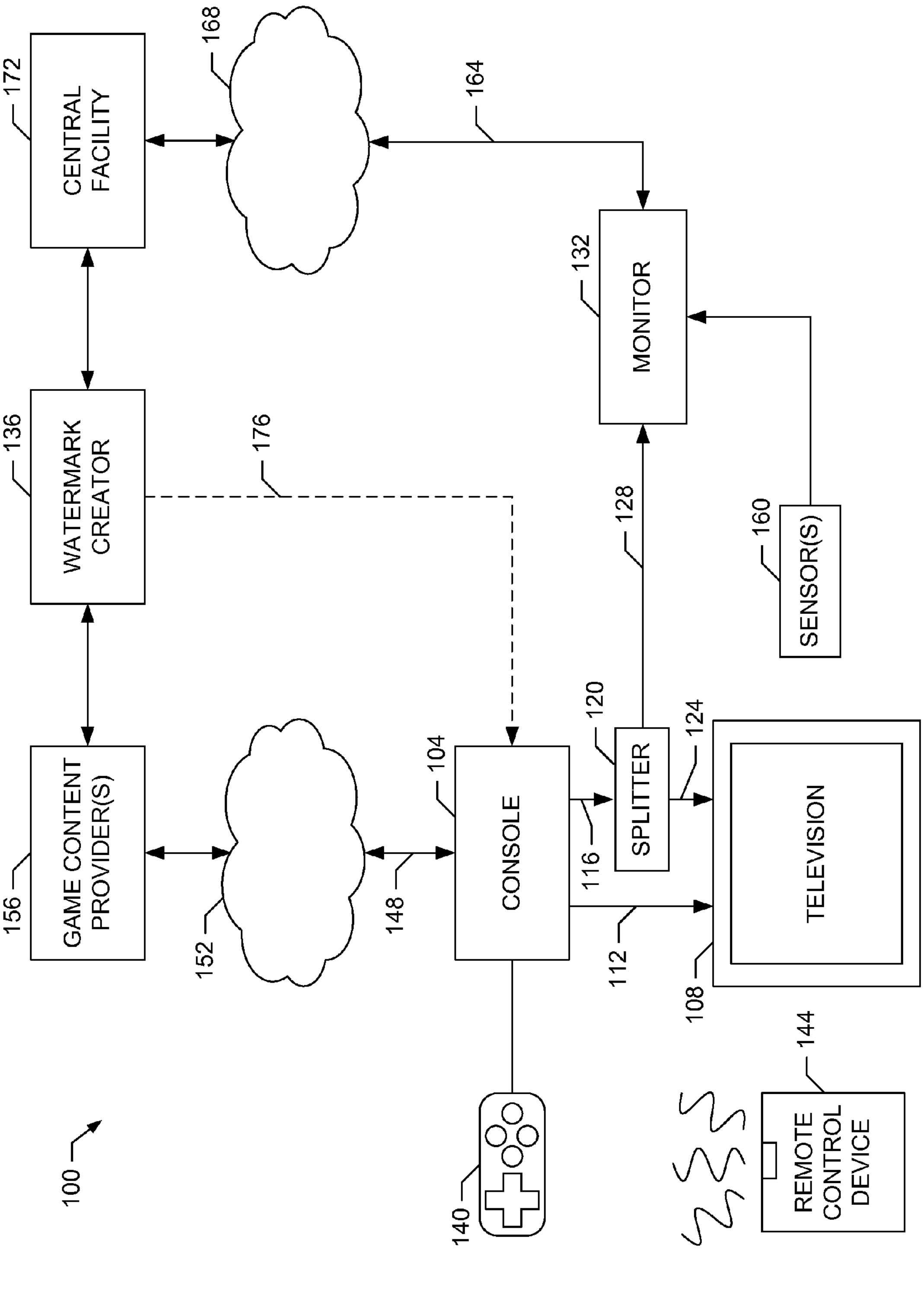
FIG. 1 is block diagram of an example environment of use in which audio watermarking of a substantially silent media content presentation can be performed according to the methods and/or apparatus described herein.

Methods and apparatus for audio watermarking a substantially silent media content presentation are disclosed herein. Although the following discloses example methods and apparatus including, among other components, software executed on hardware, it should be noted that such methods and apparatus are merely illustrative and should not be considered as limiting. For example, it is contemplated that any or all of these hardware and software components could be implemented exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

As described herein, a media content presentation, including single and multimedia content presentations, includes one or more content components (also referred to more succinctly as components) that, when combined, form the resulting media content presentation. For example, a media content presentation can include a video content component and an audio content component. Additionally, each of the video content component and the audio content component can include multiple content components. For example, a media content presentation in the form of a graphical user interface (GUI) includes multiple video content components (and possibly one or more audio content components), with each video content component corresponding to a respective GUI widget (e.g., such as a window/screen, menu, text box, embedded advertisement, etc.) capable of being presented by the GUI. As another example, a video game can include multiple video content components, such as background graphic components, foreground graphic components, characters/sprites, notification overlays, etc., as well as multiple audio content components, such as multiple special effects and/or music tracks, that are selectably presented based on the current game play context.

As described herein, a media content presentation, or a content component of a media content presentation, is considered substantially silent if, for example, it does not include an audio component, or it includes one or more audio components that have been muted or attenuated to a level near or below the auditory threshold of the average person, or near or below the ambient or background audio noise level of the environment in which the media content is being presented. For example, a GUI presented by a media presenting device can present different GUI widgets, and possibly embedded advertisements, that do not have audio components and, thus, are substantially silent. As another example, in the context of a video game presentation, a game console may present game content that is silent (or substantially silent) depending on the context of the game as it is played by a user.

As described in greater detail below, an example disclosed technique to audio watermark a media content presentation involves obtaining a watermarked noise signal containing a watermark and a noise signal having energy substantially concentrated in an audible frequency band. Unlike conventional audio watermarking techniques, in the example disclosed technique the watermarked noise signal is attenuated to be substantially inaudible without being embedded (e.g., hidden) in a separate audio signal making up the media content presentation. Additionally, the example disclosed technique involves associating the watermarked noise signal with a substantially silent content component of the media content presentation. As discussed above, a media content presentation typically includes one or more media content components, and the example technique associates the watermarked noise signal with a content component that is substantially silent. Furthermore, the example technique involves outputting the watermarked noise signal during presentation of the substantially silent content component to thereby watermark the substantially silent content component making up the media content presentation.

In at least some example implementations, the noise signal used to form the watermarked noise signal is generated by filtering a white noise signal or a pseudorandom noise signal with a bandpass filter having a passband corresponding to a desired audible frequency band. The result is a filtered noise signal, also referred to as a pink noise signal. Additionally, in at least some example implementations, the watermark is an amplitude and/or frequency modulated signal having frequencies modulated to convey digital information to identify the substantially silent content component that is to be watermarked.

As mentioned above, to identify media content, conventional audio watermarking techniques rely on an audio component of the media content having sufficient signal strength (e.g., audio level) to hide an embedded watermark such that the watermark is inaudible to a person perceiving the media content, but is detectable by a watermark detector. Unlike such conventional techniques, at least some of the example audio watermarking techniques disclosed herein do not rely on any existing audio component of the media content to hide a watermark used to identify the media content (or a particular media content component). Instead, the example disclosed audio watermarking techniques embed the watermark in a filtered (e.g., pink) noise signal residing in the audible frequency band but that is attenuated such that the signal is inaudible to a person even when no other audio signal is present. In other words, the resulting watermarked noise signal is imperceptible relative to other ambient or background noise in the environment in which the media content is being presented. By not relying on an audio signal to embed the watermark information, at least some of the example disclosed audio watermarking techniques are able to watermark media content (or a particular media content component) that is substantially silent. In contrast, many conventional audio watermarking techniques are unable to watermark substantially silent media content. In this way, the example disclosed audio watermarking techniques can be used to mark and identify media content having substantially silent content components, such as GUIs and video games, which may not be able to be marked and identified by conventional audio watermarking techniques.

Turning to the figures, a block diagram of an example environment of use 100 for implementing and using audio watermarking according to the methods and/or apparatus described herein is illustrated in FIG. 1. The environment 100 includes an example console 104 coupled to an example television 108. For example, the console 104 can be a game console to enable video games to be played in the environment 100. Such a game console 104 can be any device capable of playing a video game, such as a standard dedicated game console (e.g., such as Microsoft's Xbox™, Nintendo's Wii™, Sony's PlayStation™, etc.), a portable dedicated gaming device (e.g., such as Nintendo's GameBoy™ or DS™), etc. As another example, the console 104 can be any type of media presentation device, such as a personal digital assistant (PDA), a personal computer, a digital video disk (DVD) player, a digital video recorder (DVR), a personal video recorder (PVR), a set-top box (STB), a cable or satellite receiver, a cellular/mobile phone, etc. For convenience, and without loss of generality, the following description assumes that the console 104 corresponds to a game console 104.

The television 108 may be any type of television or, more generally, any type of media presenting device. For example, the television 108 may be a television and/or display device that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, or may be a multimedia computer system, a PDA, a cellular/mobile phone, etc.

In the illustrated example, a video signal 112 and an audio signal 116 output from the game console 104 are coupled to the television 108. The example environment 100 also includes an example splitter 120 to split the audio signal 116 into a presented audio signal 124 to be coupled to an audio input of the television 108, and a monitored audio signal 128 to be coupled to an example monitor 132. As described in greater detail below, the monitor 132 operates to detect audio watermarks included in media content presentations (or particular content components of the media content presentations) output by the game console 104 and/or television 108. Furthermore, as described in greater detail below, an example watermark creator 136 creates audio watermarks according to the example techniques described herein for inclusion in game or other media content (or content component(s)) and/or to be provided to the game console 104 (and/or television 108 or other STB (not shown)) for storage and subsequent presentation by the game console 104 for detection by the monitor 132.

The splitter 120 can be, for example, an analog splitter in the case of an analog audio output signal 116, a digital splitter (e.g., such as a High-Definition Multimedia Interface (HDMI) splitter) in the case of a digital audio output signal 116, an optical splitter in the case of an optical audio output, etc. Additionally or alternatively, such as in an example in which the game console 104 and the television 108 are integrated into a single unit, the monitored audio signal 128 can be provided by an analog or digital audio line output of the game console 104, the television 108, the integrated unit, etc. As such, the monitored signal 128 provided to the monitor 132 is typically a line quality audio signal.

As illustrated in FIG. 1, an example game controller 140 capable of sending (and possibly receiving) control information is coupled to the game console 104 to allow a user to interact with the game console 104. For example, the game controller 140 allows the user to play video games on the game console 104. Additionally or alternatively, the game controller 140 allows the user to interact with one or more GUIs presented by the game console 104 (e.g., via the television 108). For example, the game console 104 may present one or more GUIs to enable the user to configure the game console 104, configure game settings and/or initiate a game, access a gaming network, etc. The game controller 140 may be implemented using any type of game controller or user interface technology compatible with the game console 104.

Similarly, an example remote control device 144 capable of sending (and possibly receiving) control information is included in the environment 100 to allow the user to interact with the television 108. The remote control device 144 can send (and possibly receive) the control information using a variety of techniques, including, but not limited to, infrared (IR) transmission, radio frequency (RF) transmission, wired/cabled connection, etc. Like the game controller 140, the remote control device 144 allows the user to interact with one or more GUIs presented by the television 108. For example, the television 108 (or game console 104 or other STB (not shown) coupled to the television 108, etc.) may present one or more GUIs to enable the user to configure the television 108, access an electronic program guide (EPG), access a video-on-demand (VOD) program guide and/or select VOD programming for presentation, etc. In examples in which the game console 104 and the television 108 are integrated into a single unit, the game controller 140 and the remote control device 144 may correspond to the same device or different devices.

In the illustrated example, the game console 104 includes an example network connection 148 to allow the game console 104 to access an example network 152. The network connection 148 may be, for example, a Universal Serial Bus (USB) cable, an Ethernet connection, a wireless (e.g., 802.11, Bluetooth, etc.) connection, a phone line connection, a coaxial cable connection, etc. The network 152 may be, for example, the Internet, a local area network (LAN), a proprietary network provided by a gaming or other service provider, etc.

Using the network connection 148, the game console 104 is able to access the network 148 and connect with one or more example game content (or other service) providers 156. An example of such a game content provider is the Xbox LIVE™ service, which allows game content and other digital media to be downloaded to the game console 104, and also supports online multiplayer gaming. In such an example, the game console 104 implements one or more GUIs each presenting one or more GUI widgets that enable a user to access and interact with the Xbox LIVE service via the game controller 140.

To monitor media content and/or particular content components output by the game console 104 and/or television 108, the monitor 132 is configured to detect audio watermarks included in the monitored audio signal 128 and/or one or more monitored audio signals obtained by one or more example audio sensors 160 (e.g., such as one or more microphones, acoustic transducers, etc.) positionable to detect audio emissions from one or more speakers (not shown) of the television 108. As discussed in greater detail below, the monitor 132 is able to decode audio watermarks used to identify substantially silent media content and/or one or more substantially silent media content components included in a media content presentation output by the game console 104 and/or television 108. Additionally, the monitor 132 may be configured to detect conventional audio watermarks embedded in audible audio signals output by the game console 104 and/or television 108.

The monitor 132 includes an example network connection 164, which may be similar to the network connection 148, to allow the monitor 132 to access an example network 168, which may be the same as, or different from, the network 152. Using the network connection 164, the monitor 132 is able to access the network 168 to report detected audio watermarks and/or decoded watermark information (as well as any tuning information and/or other collected information) to an example central facility 172 for further processing and analysis. For example, the central facility 170 may process the detected audio watermarks and/or decoded watermark information reported by the monitor 132 to determine what media content or particular content components are being presented by the game console 104 and/or television 108 to thereby infer content consumption and interaction by a user in the environment 100.

As mentioned above, the watermark creator 136 creates audio watermarks according to the example techniques described herein for inclusion in game or other media content (or content component(s)) and/or to be provided to the game console 104 (and/or television 108 or other STB (not shown)) for storage and subsequent presentation for detection by the monitor 132. As discussed in greater detail below, the watermark creator 136 creates watermarked noise signals that can be associated with respective media content and/or respective individual content components that are themselves substantially silent and, thus, do not support conventional audio watermarking techniques. As such, a watermarked noise signal can be used to mark and identify (possible uniquely) particular media content or a particular content component. As illustrated in FIG. 1, the watermarked noise signals created by the watermark creator 136, as well as content association information, can be downloaded via the game content provider(s) 156, the network 152 and/or the network connection 148 for storage in the game console 104. Then, when the game console 104 is to output particular media content or a particular content component determined to be associated with a respective watermarked noise signal, the game console 104 retrieves the appropriate watermarked noise signal from memory and outputs it with the respective media content or content component. Because the watermarked noise signal is attenuated to be substantially inaudible, the watermarked noise signal is not perceivable by a user above the ambient or background audio noise in the vicinity of the game console 104 and/or the television 108, even though the respective media content or content component(s) being output are substantially silent. However, the monitor 132 is able to detect the watermark included in the watermarked noise signal (e.g., when the monitored audio signal 128 is processed and/or the sensor(s) 160 are positioned near the speaker(s) being monitored), thereby allow identification of substantially silent media content or content components Additionally or alternatively, the game console 104 can be pre-configured (e.g., pre-loaded) with one or more watermarked noise signals (e.g., such as watermarked noise signals associated with respective pre-configured GUI widgets presented by a console configuration GUI). Such pre-configuration is represented by a dotted line 176 in FIG. 1. Additionally or alternatively, one or more watermarked noise signals can be included with the substantially silent media content or content components themselves (e.g., such as by being included in the data file or files representing the substantially silent media content or content components). Additionally or alternatively, the game console 104 can implement some or all of the functionality of the watermark creator 136 to enable the game console 104 to create watermarked noise signals (e.g., in real-time) for output "on the fly," such as when the game console 104 determines that output audio has been muted or reduced below an audibility threshold. As illustrated in FIG. 1, the watermark creator 136 also provides its watermarked noise signals and content association information to the central facility 172 for use in processing the detected audio watermarks and/or decoded watermark information reported by the monitor 136.

Although the example environment 100 of FIG. 1 illustrates the example audio watermarking techniques disclosed herein in the context of monitoring content presented by the game console 104 and television 108, the example disclosed audio watermarking techniques can be used to audio watermark substantially silent media content or content components output by any type of media presenting device. For example, the watermark creator 136 could be configured to download and/or pre-configure watermarked noise signals for storage in the television 108, a separate STB (not shown), or any other media presenting device capable of presenting substantially silent media content or content components.

Figure 2:
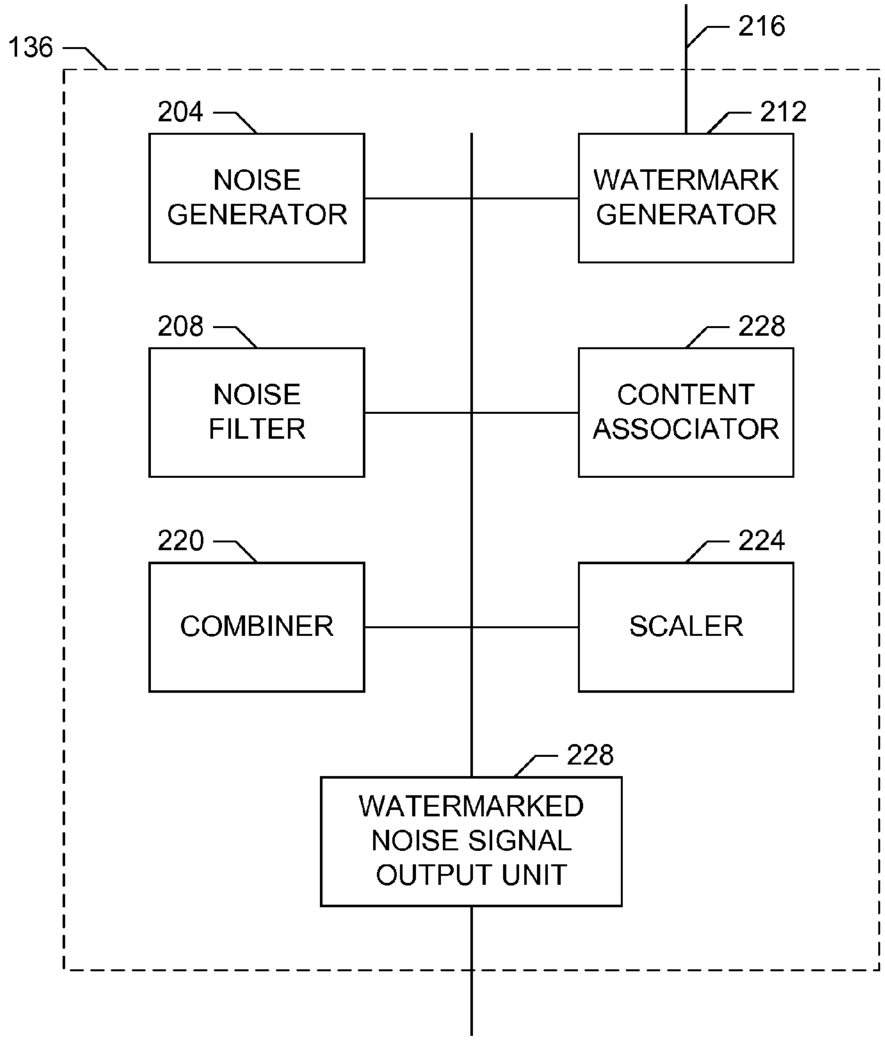
FIG. 2 is a block diagram of an example watermark creator that can be used to create watermarked noise signals for audio watermarking substantially silent media content presentations in the environment of FIG. 1.

A block diagram of an example implementation of the watermark creator 136 of FIG. 1 is illustrated in FIG. 2. The example watermark creator 136 of FIG. 2 includes an example noise generator 204 to generate a noise signal (e.g., such as a data stream or file) to form the basis of a watermarked noise signal to be used to mark or identify specific media content or a specific content component and, in particular, one that is (or expected to be) substantially silent. The noise generator 204 can implement any noise generation technique capable of generating white noise, pseudorandom noise, or any other type of noise. The watermark creator 136 of FIG. 2 also includes an example noise filter 208 to filter the noise generated by the noise generator 204. In an example, the noise filter 208 implements a bandpass filter having a passband corresponding to an audible frequency band (e.g., such as any portion of the frequency band between 300 and 3000 Hz, or any other range of frequencies considered to be humanly audible). The output of the noise filter 208 is a filtered noise signal (also referred to as a pink noise signal) that is to be combined with an audio watermark for marking or identifying the specific media content or content component.

To audio watermark the filtered noise signal from the noise filter 208, the watermark creator 136 of FIG. 2 further includes an example watermark generator 212 to generate an audio watermark to identify the specific media content or content component for which the filtered noise signal was generated. For example, the watermark generator 212 obtains content marking or identification information, or any other suitable information, via an information input 216 for marking or identifying the specific media content or content component. The watermark generator 212 then generates an audio watermark based on the information obtained via the information input 216 using any audio watermark generation or audio technique. For example, the watermark generator 212 can use the obtained marking/identification information to generate an amplitude and/or frequency modulated signal having one or more frequencies that are modulated to convey the marking/identification information. In such examples, the watermark generator 212 may be configured to amplitude and/or frequency modulate the filtered noise signal itself, or modulate or generate frequency components in a separate signal that is to be combined with the filtered noise signal. Examples of audio watermark generation techniques that can be implemented by the watermark generator 212 include, but are not limited to, the examples described by Srinivasan in U.S. Pat. No. 6,272,176, which issued on Aug. 7, 2001, in U.S. Pat. No. 6,504,870, which issued on Jan. 7, 2003, in U.S. Pat. No. 6,621,881, which issued on Sep. 16, 2003, in U.S. Pat. No. 6,968,564, which issued on Nov. 22, 2005, in U.S. Pat. No. 7,006,555, which issued on Feb. 28, 2006, and/or the examples described by Topchy et al. in U.S. Patent Publication No. 2009/0259325, which published on Oct. 15, 2009, all of which are hereby incorporated by reference in their respective entireties.

In example implementations in which the watermark generator 212 generates a separate (e.g., amplitude and/or frequency modulated) watermark signal to be combined with the filtered noise signal, the watermark creator 136 of FIG. 2 includes an example combiner 220 to combine the filtered noise signal from the noise filter 208 and the separate watermark signal from the watermark generator 212. For example, the combiner 220 can be configured to sum, mix, multiplex or otherwise embed the watermark signal into the filtered noise signal, with any appropriate scaling to ensure the watermark signal is embedded within the filtered noise signal (e.g., such as based on an average or peak power of the filtered noise signal).

Additionally, the watermark creator 136 of FIG. 2 includes an example scaler 224 to scale the watermarked noise signal from the combiner 220 or generated directly by the watermark generator 212 (e.g., when the filtered noise signal is modulated to convey the watermark information). The scaler 224 is configured to scale (e.g., attenuate) the watermarked noise signal to be substantially inaudible without needing to be embedded (e.g., hidden) in a separate audio signal making up the media content presentation. For example, the scaler 224 may be configured to attenuate the watermarked noise signal to a level (e.g., based on psychoacoustic masking) near or below the auditory threshold of the average person, or near or below an expected ambient or background audio noise level of the environment in which the media content or content component is expected to being presented.

To associate a generated watermarked noise signal with specific media content or a specific content component, the watermark creator 136 of FIG. 2 includes an example content associator 228. In an example implementation, the content associator 228 includes the marking/identification information obtained via the information input 216 and/or other descriptive information with the data file or files representing the watermarked noise signal. Then, to output watermarked noise signals and their respective content association information, the watermark creator 136 of FIG. 2 further includes an example watermarked noise signal output unit 232. In an example implementation, the watermarked noise signal output unit 232 is to send the watermarked noise signals and their respective content association information to, for example, the console 104 of FIG. 1 (or any other media presenting device) for storage and subsequent output when associated media content and/or content component(s) are presented by the console 104, as well as to the central facility 172 of FIG. 1. Additionally or alternatively, the watermarked noise signal output unit 232 can be used to pre-configure the watermarked noise signals and their respective content association information in, for example, the console 104 (or any other media presenting device). Additionally or alternatively, the watermarked noise signal output unit 232 can be used to include watermarked noise signals with the media content or content components themselves.

While an example manner of implementing the watermark creator 136 of FIG. 1 has been illustrated in FIG. 2, one or more of the elements, processes and/or devices illustrated in FIG. 2 may be combined, divided, re-arranged, omitted, eliminated and/or implemented in any other way. Further, the example noise generator 204, the example noise filter 208, the example watermark generator 212, the example combiner 220, the example scaler 224, the example content associator 228, the example watermarked noise signal output unit 232 and/or, more generally, the example watermark creator 136 of FIG. 2 may be implemented by hardware, software, firmware and/or any combination of hardware, software and/or firmware. Thus, for example, any of the example noise generator 204, the example noise filter 208, the example watermark generator 212, the example combiner 220, the example scaler 224, the example content associator 228, the example watermarked noise signal output unit 232 and/or, more generally, the example watermark creator 136 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended method claims are read to cover a purely software and/or firmware implementation, at least one of the example watermark creator 136, the example noise generator 204, the example noise filter 208, the example watermark generator 212, the example combiner 220, the example scaler 224, the example content associator 228 and/or the example watermarked noise signal output unit 232 are hereby expressly defined to include a tangible medium such as a memory, digital versatile disk (DVD), compact disk (CD), etc., storing such software and/or firmware. Further still, the example watermark creator 136 of FIG. 2 may include one or more elements, processes and/or devices in addition to, or instead of, those illustrated in FIG. 2, and/or may include more than one of any or all of the illustrated elements, processes and devices.

Figure 3:
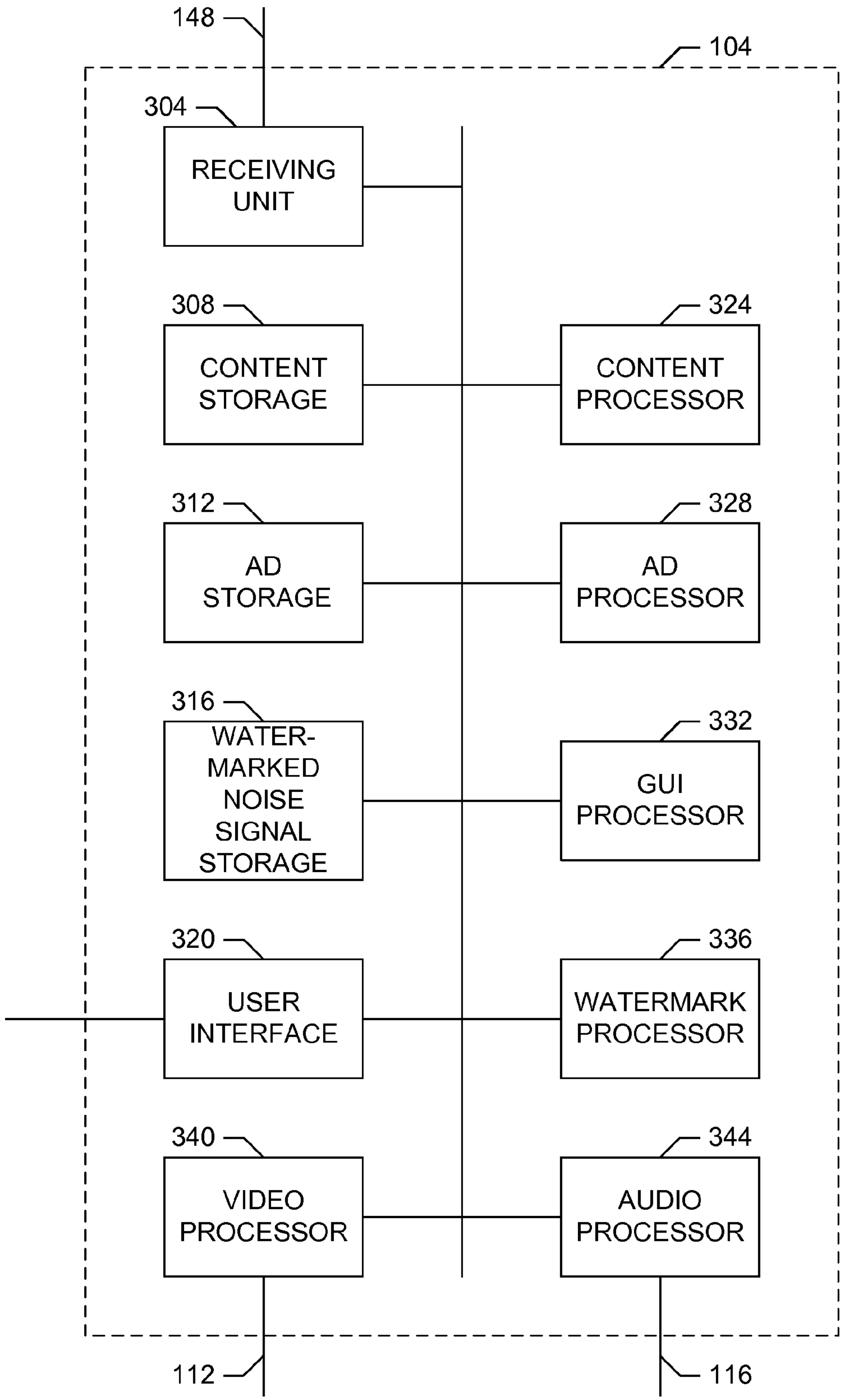
FIG. 3 is a block diagram of an example media presenting device that can be used to present watermarked noise signals that audio watermark substantially silent media content presentations in the environment of FIG. 1.

A block diagram of an example implementation of the console 104 of FIG. 1 is illustrated in FIG. 3. The illustrated example console 104 includes an example receiving unit 304 to receive media content and content components from, for example, the game content provider(s) 156 of FIG. 1. The receiving unit 304 is also to receive watermarked noise signals and content association information from, for example, the watermark creator 136 of FIGS. 1 and/or 2. As such, in an example implementation, the receiving unit 304 may implement any appropriate networking technology compliant with the network connection 148 and network 152 of FIG. 1.

The console 104 of FIG. 3 also includes an example content storage 308 to store downloaded media content and/or content components received via the receiving unit 304. Additionally or alternatively, the content storage 308 can store media content and/or content components that are pre-loaded in the console. Additionally or alternatively, the content storage 308 can store media content and/or content components obtained from a local input source, such as a DVD or CD reader, a cartridge reader, etc. Examples of the media content that may be stored in the content storage 308 include, but are not limited to, video game content, movie and other video content, music and other audio content, one or more GUIs associated with, for example, device configuration, game content configuration and navigation, content provider service configuration and navigation, EPG navigation, etc. Examples of content components that may be stored in the content storage 308 include, but are not limited to, individual video and audio content components forming the stored media content. Examples of such video content components include, but are not limited to, video game components in the form of background graphic components, foreground graphic components, characters/sprites, notification overlays, etc., and/or GUI components in the form of GUI widgets implementing different GUI windows/screens, menus, text boxes, graphic displays, etc. Examples of such audio content components include, but are not limited to, music tracks, special effects, sound notifications, etc. The content storage 308 may be implemented by any type of memory or storage technology.

The console 104 of FIG. 3 further includes an example advertisement storage 312 to store advertisements downloaded from an external source (e.g., such as the content provider(s) 156), obtained from a local source (e.g., such as a DVD and/or CD reader, a cartridge reader, etc.), preloaded into the advertisement storage 312, etc. In an example implementation, advertisements stored in the advertisement storage 312 can be embedded by the console 104 into its media content presentations. Examples of the advertisements that may be stored in the advertisement storage 312 include, but are not limited to, video advertisements, audio advertisements, still image advertisements, graphic logos, etc. The advertisement storage 312 may be implemented by any type of memory or storage technology.

The console 104 of FIG. 3 also includes a watermarked noise signal storage 316 to store watermarked noise signals downloaded from and/or pre-loaded using, for example, the watermark creator 136. Additionally, the watermarked noise signal storage 316 is to store content association information to associate watermark noise signals with respective media content or content components. The content association information may be downloaded from and/or pre-loaded using, for example, the watermark creator 136. The watermarked noise signal storage 316 may be implemented by any type of memory or storage technology. Also, the content storage 308, the advertisement storage 312 and the watermarked noise signal storage 316 may be implemented by a single memory/storage unit or two or more memory/storage units.

A user interface 320 is included in the console 104 to support user interaction via an input device, such as the game controller 140 and/or the remote control device 144 of FIG. 1, or any other type of user input device. Additionally or alternatively, the user interface 320 may provide a local user interface, such as a keypad, keyboard, mouse, stylus, touchscreen, etc., integrated in the console 104. Based on the user inputs obtained via the user interface 320, the console 104 of FIG. 3 prepares media content presentations for output using one or more of a content processor 324, an advertisement processor 328 and/or a GUI processor 332.

The content processor 324 is configured to select and prepare video and/or audio content for inclusion in a media content presentation to be output by the console 104. In an example implementation, the content processor 324 is to select and obtain video and/or audio content and/or content components from the content storage 308 based on user input(s) received via the user interface 320. Additionally or alternatively, the content processor 324 can obtain the selected video and/or audio content and/or content components by direct downloading and/or streaming from an external source, such as the content provider(s) 156. Additionally or alternatively, the content processor 324 can generate (e.g., render) video and/or audio content and/or content components on-the-fly based on, for example, stored machine-readable program instructions. The content processor 324 of the illustrated example is also configured to process the obtained video and/or audio content and/or content components for inclusion in a media content presentation. Such processing can include, but is not limited to, determining which content and content components to present when (e.g., content component sequencing), content component synchronization (e.g., such as synchronizing video and audio components), integration (e.g., overlay) with other media content and content components (e.g., such as advertisements provided by the advertisement processor 328, GUIs provided by the GUI processor 332, etc.), post-processing (e.g., such as image quality enhancement, special effects, volume control, etc.), etc.

The advertisement processor 328 is configured to select and prepare advertisements for inclusion in a media content presentation to be output by the console 104. In an example implementation, the advertisement processor 328 is to select and obtain advertisements or advertisement components from the advertisement storage 312 based on user input(s) received via the user interface 320 and/or other selection criteria (e.g., such as a random selection, selection tied to selected audio/video content, etc.). Additionally or alternatively, the advertisement processor 328 can obtain the advertisements by direct downloading and/or streaming from an external source, such as the content provider(s) 156. Additionally or alternatively, the advertisement processor 328 can generate (e.g., render) advertisements on-the-fly based on, for example, stored machine-readable program instructions (e.g., such as in the case of logos and/or still image advertisements). The advertisement processor 328 of the illustrated example is also configured to process the advertisement for inclusion in a media content presentation. Such processing can include, but is not limited to, scaling, cropping, volume control, etc.

The GUI processor 332 is configured to select and prepare a GUI for inclusion in a media content presentation to be output by the console 104. In an example implementation, the GUI processor 332 is to a select and obtain a GUI and/or one or more GUI content components (e.g., GUI widgets) from the content storage 308 based on user input(s) received via the user interface 320 and/or other selection criteria (e.g., such as automatic, or pop-up, presentation of GUIs or GUI widgets). Additionally or alternatively, the GUI processor 332 can obtain the selected GUI and/or GUI content components by direct downloading and/or streaming from an external source, such as the content provider(s) 156. Additionally or alternatively, the GUI processor 332 can generate (e.g., render) GUIs and/or GUI content components on-the-fly based on, for example, stored machine-readable program instructions. The GUI processor 332 of the illustrated example is also configured to process the obtained GUIs and/or GUI content components for inclusion in a media content presentation. Such processing can include, but is not limited to, determining which GUI components (e.g., widgets) to present and when to present them, integration (e.g., overlay) with other media content and content components (e.g., such as insertion of advertisements into a window of a GUI, insertion of video content in a window of a GUI, etc.), post-processing (e.g., such as highlighting of windows, text, menus, buttons and/or other special effects), etc.

To enable substantially silent media content and/or content components to be audio watermarked, the console 104 of FIG. 3 includes an example watermark processor 336. The watermark processor 336 is configured to determine whether the media content and/or content component to be included in a media content presentation is also associated with a watermarked noise signal stored in the watermarked noise signal storage 316. In an example implementation, the watermark processor 336 determines whether content association information is stored in the watermarked noise signal storage 316 for any, some or all of the content components to be included in a media content presentation to be output by the console 104. A content component examined by the watermark processor 336 can be a content component obtained/generated by, for example, the content processor 324, the advertisement processor 328 or the GUI processor 332. In at least some example implementations, the watermark processor 336 can limit such an examination to content components that are substantially silent (e.g., to reduce processing load). For example, the watermark processor 336 can determine that a content component is substantially silent if it does not have any audio component, or if at least one of the content processor 324, the advertisement processor 328 or the GUI processor 332 have rendered the content component substantially silent via post-processing (e.g., such as audio muting to volume control).

Assuming an examined content component is determined to be associated with a watermarked noise signal, the watermark processor 336 then obtains the respective watermarked noise signal associated with the examined content component from the watermarked noise signal storage 316. Additionally, the watermark processor 336 can perform post-processing on the obtained watermarked noise signal, such as audio attenuation or amplification, synchronization with the presentation of the associated content component, etc., to prepare the watermarked noise signal to be output by the console 104. For example, if the obtained watermarked noise signal has not already been scaled to be substantially inaudible without needing to be combined with (e.g., hidden in) a separate audio signal, the watermark processor 336 can perform such scaling. Additionally or alternatively, the watermark processor 336 can scale the obtained watermarked noise signal based on a configuration input and/or, if present, an audio sensor (not shown), to account for the ambient or background audio in the vicinity of the console 104. For example, in a loud environment, the audio level of the watermarked noise signal can be increased, whereas in a quiet environment, the audio level of the watermarked noise signal may need to be decreased.

In at least some example implementations, the watermark processor 336 may also select and obtain a watermarked noise signal from the watermarked noise signal storage 316 (or create the watermarked noise signal on-the-fly by implementing some or all of the functionality of the watermark creator 136 described above) based on an operating state of the console 104 instead of, or in addition to, being based on whether a particular (e.g., substantially silent) content component is to be included in the media content presentation. For example, if the watermark processor 336 determines that the console 104 is operating in substantially silent state, such as a mute state in which output audio has been muted or a low-volume state in which the output audio is below an auditory threshold, the watermark processor 336 may obtain a watermarked noise signal associated with and identifying the particular operating state (e.g., the mute state) for output while the console 104 is operating in that state. The watermarked noise signal may also identify one or more activities (e.g., such as applications, operations, etc.) being executed by the console 104 while the console is in the particular operating state (e.g., the mute state) causing the watermarked noise signal to be output. Additionally or alternatively, the watermark processor 336 may be configured to implement some or all of the functionality of the watermark creator 136 of FIG. 2 to create watermarked noise signals (as well as content association information) on-the-fly instead of, or in addition to, obtaining the watermarked noise signals from the watermarked noise signal storage 316.

To output a media content presentation (e.g., such as including any, some or all of a video game presentation, a GUI, an embedded advertisement, etc.), the console 104 of FIG. 3 includes a video processor 340 to prepare and generate the video signal 112 output from the console 104, and an audio processor 344 to prepare and generate the audio signal 116 output from the console 104. Additionally, the audio processor 344 implements any appropriate combining operation (e.g., such as summing, mixing, multiplexing, etc.) to combine one or more watermarked noise signals obtained by the watermark processor 336 into the media content presentation being output. Any appropriate video and audio technology can be used to implement the video processor 340 and the audio processor 344.

Although the example of FIG. 3 has been described in the context of implementing the console 104 of FIG. 1, any, some or all of the elements/components illustrated in FIG. 3 could be used to implement any type of media presenting device. For example, any, some or all of the example receiving unit 304, the example content storage 308, the example advertisement storage 312, the example watermarked noise signal storage 316, the example user interface 320, the example content processor 324, the example advertisement processor 328, the example GUI processor 332, the example watermark processor 336, the example video processor 340 and/or the example audio processor 344 could be used to implement, or could be implemented by, a STB, personal computer, a PDA, a mobile phone, etc., or any other type of media presenting device.

While an example manner of implementing the console 104 of FIG. 1 has been illustrated in FIG. 3, one or more of the elements, processes and/or devices illustrated in FIG. 3 may be combined, divided, re-arranged, omitted, eliminated and/or implemented in any other way. Further, the example receiving unit 304, the example content storage 308, the example advertisement storage 312, the example watermarked noise signal storage 316, the example user interface 320, the example content processor 324, the example advertisement processor 328, the example GUI processor 332, the example watermark processor 336, the example video processor 340, the example audio processor 344 and/or, more generally, the example console 104 of FIG. 3 may be implemented by hardware, software, firmware and/or any combination of hardware, software and/or firmware. Thus, for example, any of the example receiving unit 304, the example content storage 308, the example advertisement storage 312, the example watermarked noise signal storage 316, the example user interface 320, the example content processor 324, the example advertisement processor 328, the example GUI processor 332, the example watermark processor 336, the example video processor 340, the example audio processor 344 and/or, more generally, the example console 104 could be implemented by one or more circuit(s), programmable processor(s), ASIC(s), PLD(s) and/or FPLD(s), etc. When any of the appended method claims are read to cover a purely software and/or firmware implementation, at least one of the example console 104, the example receiving unit 304, the example content storage 308, the example advertisement storage 312, the example watermarked noise signal storage 316, the example user interface 320, the example content processor 324, the example advertisement processor 328, the example GUI processor 332, the example watermark processor 336, the example video processor 340 and/or the example audio processor 344 are hereby expressly defined to include a tangible medium such as a memory, DVD, CD, etc., storing such software and/or firmware. Further still, the example console 104 of FIG. 3 may include one or more elements, processes and/or devices in addition to, or instead of, those illustrated in FIG. 3, and/or may include more than one of any or all of the illustrated elements, processes and devices.

Figure 4:
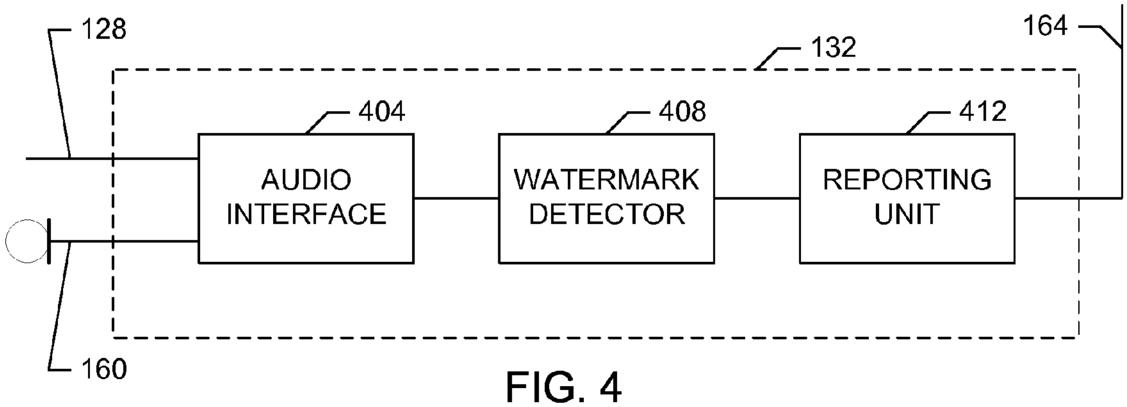
FIG. 4 is a block diagram of an example monitor that can be used to detect audio watermarks in the environment of FIG. 1.

A block diagram of an example implementation of the monitor 132 of FIG. 1 is illustrated in FIG. 4. The illustrated example monitor 132 (also referred to as a meter 132) includes an example audio interface 404 to receive the monitored audio signal 128 from, for example, the console 104 of FIG. 1 (or any other media presenting device being monitored). Additionally or alternatively, the audio interface 404 can be configured to receive a monitored audio signal from one or more of, for example, the sensor(s) 160 of FIG. 1. The audio interface 404 amplifies, conditions, combines and/or otherwise prepares the received monitored audio signal(s) for subsequent processing.

The monitor 132 of FIG. 4 also includes an example watermark detector 408 configured to detect audio watermarks in a monitored audio signal obtained from the audio interface 408. For example, the watermark detector 408 is able to detect a watermark included in a watermarked noise signal output from the console 104 of FIGS. 1 and/or 3. The watermarks detected by the watermark detector 408 in the substantially inaudible watermarked noise signals allow presentation and consumption of substantially silent media content and/or content components to be monitored by the monitor 132. For example, watermarks detected from a watermarked noise signal can mark or identify that a particular portion of a video game has been reached or accessed by a user, that a particular embedded advertisement has been included in presented game content or a presented GUI, that a particular GUI widget has be presented or accessed, etc.

Additionally, in at least some example implementations, the watermark detector 408 is able to detect conventional audio watermarks embedded (e.g., hidden) in the media content presented by, for example, the console 104. Furthermore, in at least some example implementations, the watermark detector 408 is configured to decode detected audio watermarks to determine the marking and/or other identifying information represented by the watermark. Examples of watermark detection techniques that can be implemented by the watermark detector 408 include, but are not limited to, the examples disclosed in the above-referenced U.S. Pat. No. 6,272,176, U.S. Pat. No. 6,504,870, U.S. Pat. No. 6,621,881, U.S. Pat. No. 6,968,564, U.S. Pat. No. 7,006,555, and/or U.S. Patent Publication No. 2009/0259325.

The monitor 132 of FIG. 4 further includes an example reporting unit 412 configured to report detected audio watermarks and/or decoded watermark information to, for example, the central facility 172 of FIG. 1. For example, the reporting unit 412 can buffer detected audio watermarks and/or decoded watermark information into one or more data files, data records, etc., for transmission via the network connection 164 and network 168 to the central facility 172. Any appropriate data storage and reporting technology can be used to implement the reporting unit 412.

While an example manner of implementing the monitor 132 of FIG. 1 has been illustrated in FIG. 4, one or more of the elements, processes and/or devices illustrated in FIG. 4 may be combined, divided, re-arranged, omitted, eliminated and/or implemented in any other way. Further, the example audio interface 404, the example watermark detector 408, the example reporting unit 412 and/or, more generally, the example monitor 132 of FIG. 4 may be implemented by hardware, software, firmware and/or any combination of hardware, software and/or firmware. Thus, for example, any of the example audio interface 404, the example watermark detector 408, the example reporting unit 412 and/or, more generally, the example monitor 132 could be implemented by one or more circuit(s), programmable processor(s), ASIC(s), PLD(s) and/or FPLD(s), etc. When any of the appended method claims are read to cover a purely software and/or firmware implementation, at least one of the example monitor 132, the example audio interface 404, the example watermark detector 408 and/or the example reporting unit 412 are hereby expressly defined to include a tangible medium such as a memory, DVD, CD, etc., storing such software and/or firmware. Further still, the example monitor 132 of FIG. 4 may include one or more elements, processes and/or devices in addition to, or instead of, those illustrated in FIG. 4, and/or may include more than one of any or all of the illustrated elements, processes and devices.

Figure 5:
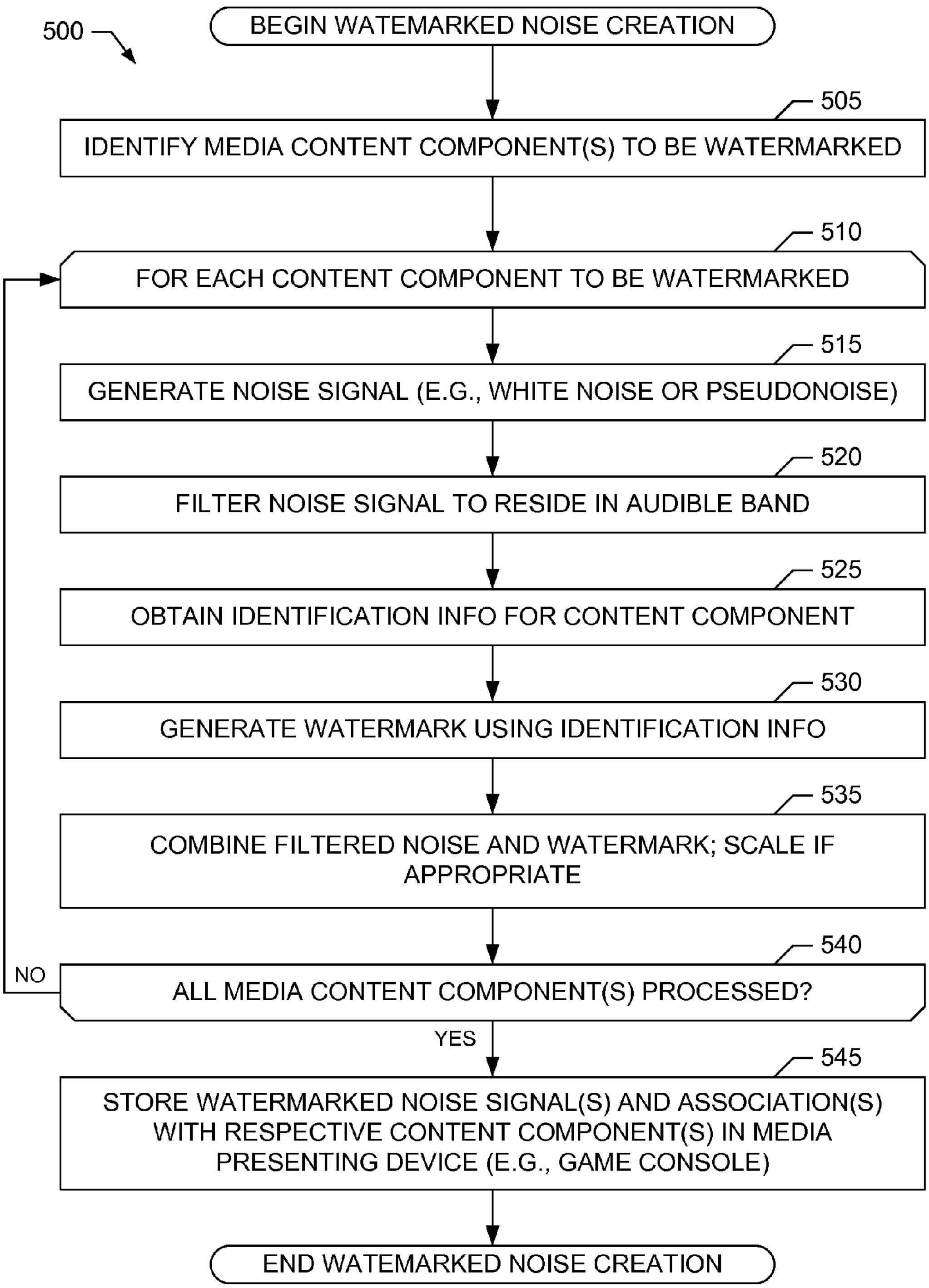
FIG. 5 is a flowchart representative of an example process for creating watermarked noise signals that may be performed to implement the watermark creator of FIG. 2.
Figure 6:
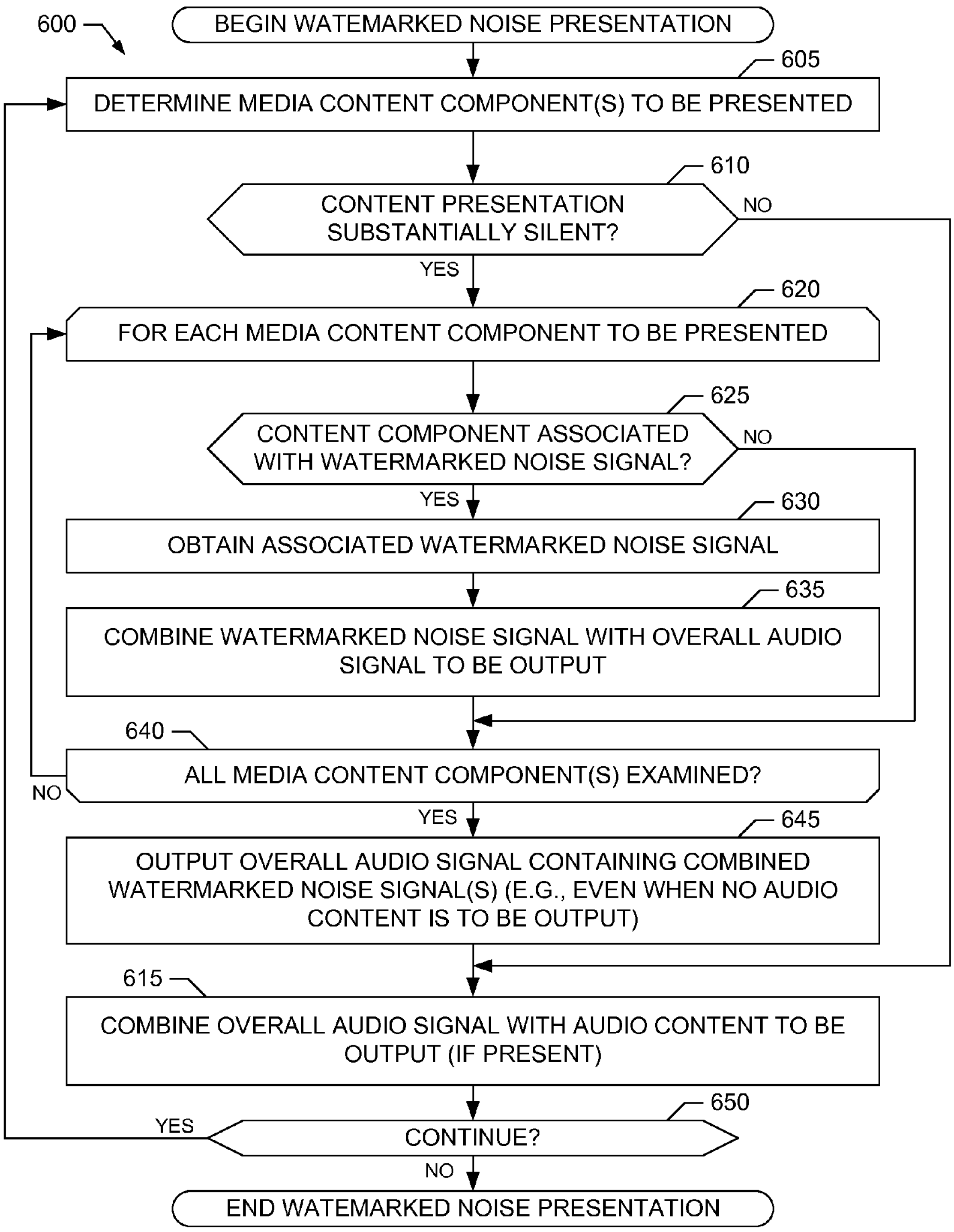
FIG. 6 is flowchart representative of an example process for presenting watermarked noise signals that may be performed to implement the media presenting device of FIG. 3.
Figure 7:
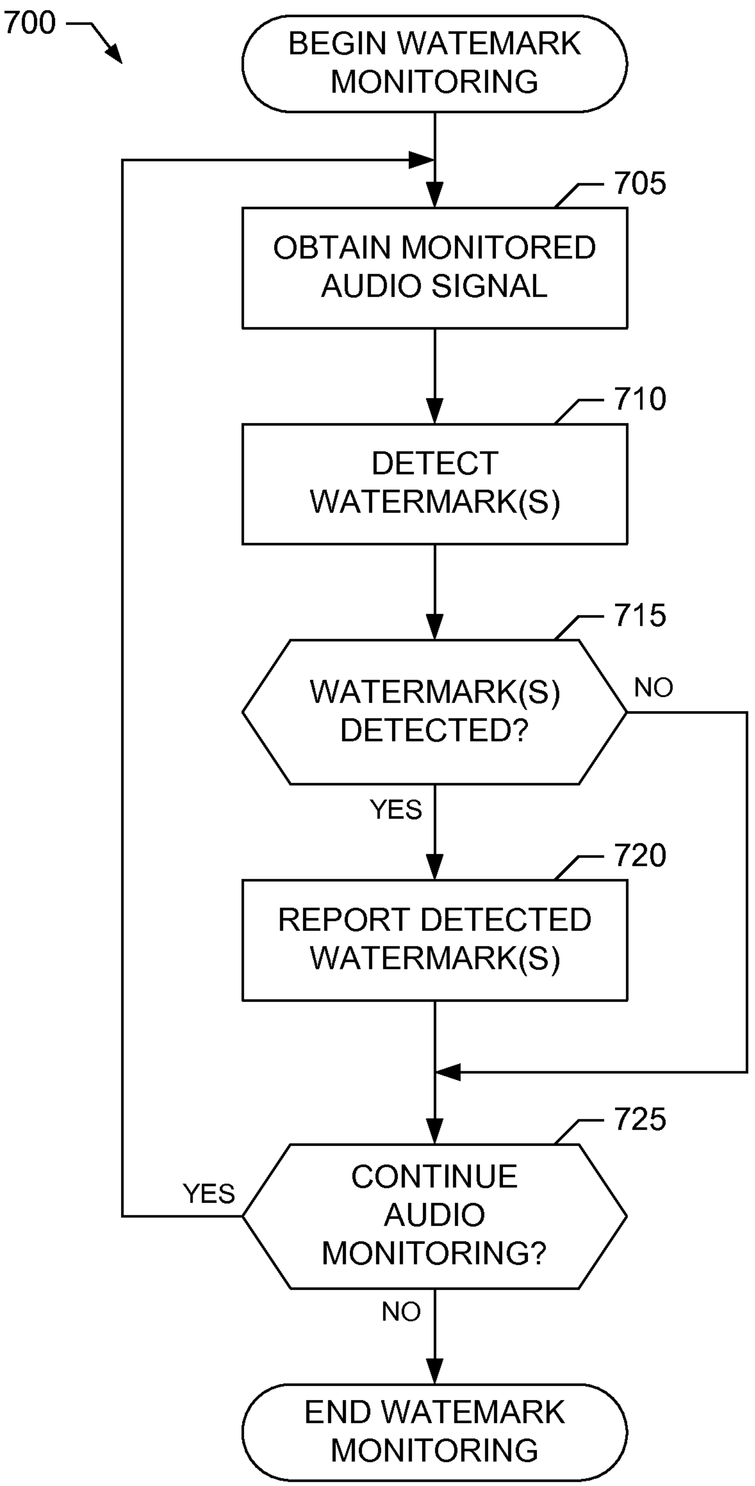
FIG. 7 is a flowchart representative of an example process for audio watermark monitoring that may be performed to implement the monitor of FIG. 4.

Flowcharts representative of example processes that may be executed to implement the example environment 100, the example console 104, the example monitor 132, the example watermark creator 136, the example noise generator 204, the example noise filter 208, the example watermark generator 212, the example combiner 220, the example scaler 224, the example content associator 228, the example watermarked noise signal output unit 232, the example receiving unit 304, the example content storage 308, the example advertisement storage 312, the example watermarked noise signal storage 316, the example user interface 320, the example content processor 324, the example advertisement processor 328, the example GUI processor 332, the example watermark processor 336, the example video processor 340, the example audio processor 344, the example audio interface 404, the example watermark detector 408 and/or the example reporting unit 412 are shown in FIGS. 5-7. In these examples, the process represented by each flowchart may be implemented by one or more programs comprising machine readable instructions for execution by: (a) a processor, such as the processor 812 shown in the example processing system 800 discussed below in connection with FIG. 8, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 812, but the entire program or programs and/or portions thereof could alternatively be executed by a device other than the processor 812 and/or embodied in firmware or dedicated hardware (e.g., implemented by an ASIC, a PLD, an FPLD, discrete logic, etc.).

For example, any or all of the example environment 100, the example console 104, the example monitor 132, the example watermark creator 136, the example noise generator 204, the example noise filter 208, the example watermark generator 212, the example combiner 220, the example scaler 224, the example content associator 228, the example watermarked noise signal output unit 232, the example receiving unit 304, the example content storage 308, the example advertisement storage 312, the example watermarked noise signal storage 316, the example user interface 320, the example content processor 324, the example advertisement processor 328, the example GUI processor 332, the example watermark processor 336, the example video processor 340, the example audio processor 344, the example audio interface 404, the example watermark detector 408 and/or the example reporting unit 412 could be implemented by any combination of software, hardware, and/or firmware. Also, some or all of the processes represented by the flowcharts of FIGS. 5-7 may be implemented manually. Further, although the example processes are described with reference to the flowcharts illustrated in FIGS. 5-7, many other techniques for implementing the example methods and apparatus described herein may alternatively be used. For example, with reference to the flowcharts illustrated in FIGS. 5-7, the order of execution of the blocks may be changed, and/or some of the blocks described may be changed, eliminated, combined and/or subdivided into multiple blocks.

An example process 500 that may be executed to implement the example watermark creator 136 of FIG. 2 is illustrated in FIG. 5. The process 500 may be executed, for example, when watermarked noise signals are to be created for one or more substantially silent content components. With reference to FIG. 2 and the associated description provided above, the process 500 of FIG. 5 begins execution at block 505 at which the watermark creator 136 identifies a set of substantially silent media content components to be audio watermarked. For example, the set of substantially silent media content components can be specified by a game content provider, a console manufacturer, etc. Then, for each identified content component (block 510), the noise generator 204 included in the watermark creator 136 generates a white or pseudorandom noise signal (e.g., such as a data stream or file) to form the basis of a watermarked noise signal to be used to watermark the respective content component. Next, at block 520 the noise filter 208 included in the watermark creator 136 filters the noise signal generated at block 515 to determine a filtered (pink) noise signal.

At block 525, the watermark creator 136 obtains identification or other marking information for each content component via the information input 216. Next, at block 530 the watermark generator 212 included in the watermark creator 136 generates an audio watermark for each content component representative of the information obtained at block 525. For example, at block 525 the watermark generator 212 can generate an amplitude and/or frequency modulated signal having one or more frequencies that are modulated to convey the information obtained at block 525. As another example, at block 525 the watermark generator 212 can modulate the filtered noise signal determined at block 520 directly to convey the identification information obtained at block 525.

At block 535, the combiner 220 included in the watermark creator 136 combines the filtered noise signal with the separate watermark signal to form a watermarked noise signal (e.g., if the filtered noise signal was not modulated directly by the watermark generator 212 to determine the watermarked noise signal). Additionally, at block 535 the scaler 224 included in the watermark creator 136 scales the watermarked noise signal to be substantially inaudible without needing to be embedded (e.g., hidden) in a separate audio signal making up the media content presentation. Then, if all identified components have not been watermarked (block 540), processing returns to block 510 and blocks subsequent thereto to audio watermark the next substantially silent content component. However, if all components have been watermarked (block 540), then at block 545 the content associator 228 (possibly in conjunction with the watermarked noise signal output unit 232) included in the watermark creator 136 stores the content association information (e.g., corresponding to the information obtained at block 515), along with the watermarked noise signals in, for example, the console 104 to allow each watermarked noise signal to be associated with its respective media content component. Execution of the example process 500 then ends.

An example process 600 that may be executed to implement the example console 104 of FIG. 3 is illustrated in FIG. 6. The process 600 may be executed, for example, continuously as a background process to output watermarked noise signals associated with one or more substantially silent content components included in a media content presentation being output by the console 104. With reference to FIG. 3 and the associated description provided above, the process 600 of FIG. 6 begins execution at block 605 at which the content processor 324, the advertisement processor 328 and/or the GUI processor 332 included in the console 104 determines a set of media content components to be included in an output media content presentation. Then, at block 610 the watermark processor 336 included in the console 104 determines whether the resulting media content presentation will be substantially silent such that watermarked noise signals can be detected. If the media content presentation will not be substantially silent (block 610), processing proceeds to block 615, which is discussed in greater detail below. However, if the media content presentation will be substantially silent (block 610), the watermark processor 336 examines each content component to be included in the media content presentation (block 620). In at least some example implementation, the decision at block 610 can be eliminated and processing can proceed directly from block 605 to block 620.

At block 620, the watermark processor 336 examines each content component to be included in the media content presentation. In particular, at block 625 the watermark processor 336 determines whether each content component is associated with a respective watermarked noise signal stored in the watermarked noise signal storage 316 and/or that is to be generated on-the-fly by the watermark processor 336. For example, the watermark processor 336 may examine content association information stored in the watermarked noise signal storage 316 to determine whether a particular (substantially silent) content component is associated with a respective watermarked noise signal. If a particular content component is determined to be associated with a respective watermarked noise signal (block 625), then at block 630 the watermark processor 336 obtains the respective watermarked noise signal (e.g., from the watermarked noise signal storage 316 or by on-the-fly generation). Then, at block 635 the audio processor 344 combines the watermarked noise signal obtained at block 630 with the overall audio signal to be output from the console 104.

Then, if there are still content components remaining to be examined (block 640), processing returns to block 620 at which the next content component is examined by the watermark processor 336. Otherwise, if all content components have been examined (block 640), processing proceeds to block 645 at which the audio processor 344 outputs a combination of all the watermarked noise signals for all the respective substantially silent content components as combined via the processing at block 635. As such, multiple, overlapping watermarked noise signals associated with multiple substantially silent content components can be output by the console 104 at substantially the same time. Then, at block 615 the audio processor 344 combines the combined watermarked noise signals with any audible audio content to be output with the media content presentation. The processing at block 615 is optional, especially in example implementations in which the decision at block 610 is included and, as such, watermarked noise signals will be output only if the media content presentation is substantially silent.

Next, if the console 104 determines that media content presentation is to continue (block 650), processing returns to block 605 and blocks subsequent thereto. Otherwise, execution of the example process 600 ends.

An example process 700 that may be executed to implement the example monitor 132 of FIG. 4 is illustrated in FIG. 7. The process 700 may be executed, for example, continuously as a background process to detect watermarks in watermarked noise signals associated with one or more substantially silent content components included in a monitored media content presentation, as well as audio watermarks embedded (e.g., hidden) in one or more audible audio components of the monitored media content presentation. With reference to FIG. 4 and the associated description provided above, the process 700 of FIG. 7 begins execution at block 705 at which the audio interface 404 included in the monitor 132 obtains a monitored audio signal (e.g., such as the monitored audio 128 from the console 104, a monitored audio signal from an audio sensor 160 positioned near the console 104, or any other monitored audio signal corresponding to any other media presenting device being monitored).

Next, at block 710 the watermark detector 408 included in the monitor 132 detects any watermarks included in the monitored audio signal(s) obtained at block 705. For example, at block 710 the watermark detector 408 may detect watermark(s) included in watermarked noise signal(s) output from the console 104 or other media presenting device being monitored. Additionally or alternatively, the block 710 the watermark detector 408 may detect audio watermarks embedded (e.g., hidden) in audible audio content being presented by the console 104 or other media presenting device (as described above). For example, because audible audio content may overpower any watermarked noise signals, conventional audio watermarks embedded (e.g., hidden) in audible audio content may be detectable by the watermark detector 408 even if any watermarked noise signals are present. If any watermarks are detected (block 715), then at block 720 the reporting unit 412 included in the monitor 132 reports the detected watermarks and/or decoded watermark information to, for example, the central facility 172 (as described above). Then, if monitoring is to continue (block 725), processing returns to block 705 and blocks subsequent thereto. Otherwise, execution of the example process 700 ends.

Figure 8:
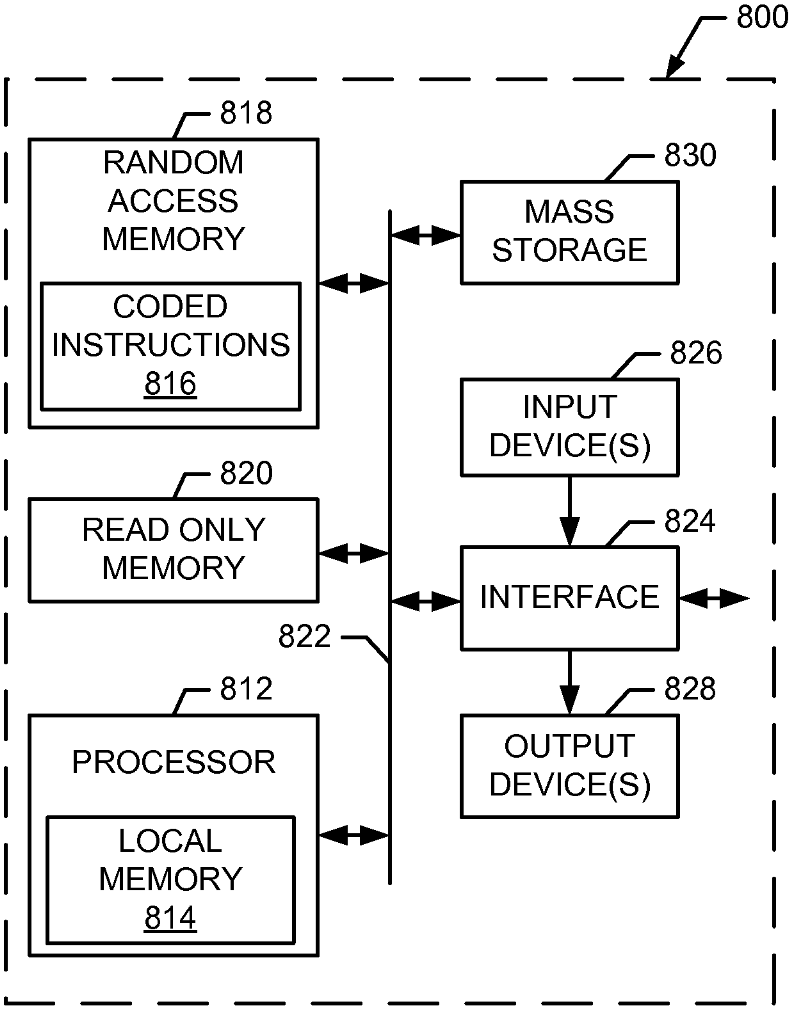
FIG. 8 is a block diagram of an example processing system that may execute example machine readable instructions used to implement any, some or all of the processes of FIGS. 5-7 to implement the watermark creator of FIG. 2, the media presenting device of FIG. 3, the monitor of FIG. 4 and/or the example environment of FIG. 1.

FIG. 8 is a block diagram of an example processing system 800 capable of implementing the apparatus and methods disclosed herein. The processing system 800 can be, for example, a server, a personal computer, a personal digital assistant (PDA), an Internet appliance, a DVD player, a CD player, a digital video recorder, a personal video recorder, a set top box, or any other type of computing device.

The system 800 of the instant example includes a processor 812 such as a general purpose programmable processor. The processor 812 includes a local memory 814, and executes coded instructions 816 present in the local memory 814 and/or in another memory device. The processor 812 may execute, among other things, machine readable instructions to implement the processes represented in FIGS. 5-7. The processor 812 may be any type of processing unit, such as one or more microprocessors from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 812 is in communication with a main memory including a volatile memory 818 and a non-volatile memory 820 via a bus 822. The volatile memory 818 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 820 may be implemented by flash memory and/or any other desired type of memory device. Access to the main memory 818, 820 is typically controlled by a memory controller (not shown).

The processing system 800 also includes an interface circuit 824. The interface circuit 824 may be implemented by any type of interface standard, such as an Ethernet interface, a universal serial bus (USB), and/or a third generation input/output (3GIO) interface.

One or more input devices 826 are connected to the interface circuit 824. The input device(s) 826 permit a user to enter data and commands into the processor 812. The input device(s) can be implemented by, for example, a keyboard, a mouse, a touchscreen, a track-pad, a trackball, an isopoint and/or a voice recognition system.

One or more output devices 828 are also connected to the interface circuit 824. The output devices 828 can be implemented, for example, by display devices (e.g., a liquid crystal display, a cathode ray tube display (CRT)), by a printer and/or by speakers. The interface circuit 824, thus, typically includes a graphics driver card.

The interface circuit 824 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 800 also includes one or more mass storage devices 830 for storing software and data. Examples of such mass storage devices 830 include floppy disk drives, hard drive disks, compact disk drives and digital versatile disk (DVD) drives. The mass storage device 830 may implement the example content storage 308, the example advertisement storage 312 and/or the example watermarked noise signal storage 316. Alternatively, the volatile memory 818 may implement the example content storage 308, the example advertisement storage 312 and/or the example watermarked noise signal storage 316.

As an alternative to implementing the methods and/or apparatus described herein in a system such as the processing system of FIG. 8, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:

obtaining, by executing an instruction with a processor, a watermarked noise signal having energy in a first frequency band, the watermarked noise signal being associated with a first operating state of a device;

adjusting, by executing an instruction with the processor, the watermarked noise signal based on an ambient audio level sensed by an audio sensor; and emitting the adjusted watermarked noise signal via a speaker in response to determining that the device is in the first operating state.

2. The method as defined in claim 1, wherein the adjusted watermarked noise signal is an amplified watermarked noise signal, and adjusting the watermarked noise signal includes amplifying the watermarked noise signal to determine the amplified watermarked noise signal.

3. The method as defined in claim 2, wherein amplifying the watermarked noise signal includes increasing a level of the watermarked noise signal.

4. The method as defined in claim 2, wherein the first frequency band includes an audible frequency band, the audio sensor is positioned to sense audio in an environment in which the device is operating, and the amplified watermarked noise signal, when emitted by the speaker, is to have a level that is to remain substantially inaudible in the environment in which the device is operating without combining the amplified watermarked noise signal with a separate audio signal.

5. The method as defined in claim 1, wherein the adjusted watermarked noise signal is an attenuated watermarked noise signal, and adjusting the watermarked noise signal includes decreasing a level of the watermarked noise signal to determine the attenuated watermarked noise signal.

6. The method as defined in claim 1, wherein obtaining the watermarked noise signal includes:

generating a random noise signal;

filtering the random noise signal with a bandpass filter having a passband corresponding to the first frequency band to determine a filtered noise signal; and modulating the filtered noise signal to determine the watermarked noise signal.

7. The method as defined in claim 1, wherein the first operating state corresponds to an audio mute state.

8. A tangible computer readable storage device or storage disk including computer readable instructions which, when executed, cause a processor to at least:

obtain a watermarked noise signal having energy in a first frequency band, the watermarked noise signal being associated with a first operating state of a device;

adjust the watermarked noise signal based on an ambient audio level sensed by an audio sensor; and cause the adjusted watermarked noise signal to be emitted via a speaker in response to determining that the device is in the first operating state.

9. The tangible computer readable storage device or storage disk as defined in claim 8, wherein the adjusted watermarked noise signal is an amplified watermarked noise signal, and to adjust the watermarked noise signal, the instructions, when executed, further cause the processor to amplify the watermarked noise signal to determine the amplified watermarked noise signal.

10. The tangible computer readable storage device or storage disk as defined in claim 9, wherein the instructions, when executed, further cause the processor to increase a level of the watermarked noise signal to amplify the watermarked noise signal.

11. The tangible computer readable storage device or storage disk as defined in claim 9, wherein the first frequency band includes an audible frequency band, the audio sensor is positioned to sense audio in an environment in which the device is operating, and the amplified watermarked noise signal, when emitted by the speaker, is to have a level that is to remain substantially inaudible in the environment in which the device is operating without combining the amplified watermarked noise signal with a separate audio signal.

12. The tangible computer readable storage device or storage disk as defined in claim 8, wherein the adjusted watermarked noise signal is an attenuated watermarked noise signal, and to adjust the watermarked noise signal, the instructions, when executed, further cause the processor to decrease a level of the watermarked noise signal to determine the attenuated watermarked noise signal.

13. The tangible computer readable storage device or storage disk as defined in claim 8, wherein to obtain the watermarked noise signal, the instructions, when executed, further cause the processor to:

generate a random noise signal;

filter the random noise signal with a bandpass filter having a passband corresponding to the first frequency band to determine a filtered noise signal; and modulate the filtered noise signal to determine the watermarked noise signal.

14. The tangible computer readable storage device or storage disk as defined in claim 8, wherein the first operating state corresponds to an audio mute state.

15. An apparatus comprising:

a watermark processor to:

obtain a watermarked noise signal having energy in a first frequency band, the watermarked noise signal being associated with a first operating state of a device; and adjust the watermarked noise signal based on an ambient audio level sensed by an audio sensor; and an audio processor to cause the adjusted watermarked noise signal to be emitted via a speaker after the device is determined to be in the first operating state.

16. The apparatus as defined in claim 15, wherein the adjusted watermarked noise signal is an amplified watermarked noise signal, and the watermark processor is further to amplify the watermarked noise signal to determine the amplified watermarked noise signal.

17. The apparatus as defined in claim 16, wherein the watermark processor is to increase a level of the watermarked noise signal to amplify the watermarked noise signal.

18. The apparatus as defined in claim 16, wherein the first frequency band includes an audible frequency band, the audio sensor is positioned to sense audio in an environment in which the device is operating, and the amplified watermarked noise signal, when emitted by the speaker, is to have a level that is to remain substantially inaudible in the environment in which the device is operating without combining the amplified watermarked noise signal with a separate audio signal.

19. The apparatus as defined in claim 15, wherein the adjusted watermarked noise signal is an attenuated watermarked noise signal, and the watermark processor is to decrease a level of the watermarked noise signal to determine the attenuated watermarked noise signal.

20. The apparatus as defined in claim 15, wherein the first operating state corresponds to an audio mute state.

* * * * *